(12) United States Patent
Dubanchet et al.

(10) Patent No.: US 10,265,726 B2
(45) Date of Patent: Apr. 23, 2019

(54) METHOD FOR DECORATING A KITCHEN ITEM BY MECHANICAL TREATMENT

(71) Applicant: SEB S.A., Ecully (FR)

(72) Inventors: Aurélien Dubanchet, Gresy sur Aix (FR); Laurent Caillier, Pringy (FR); Germain Buffault, Cran Gevrier (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/540,157

(22) PCT Filed: Dec. 21, 2015

(86) PCT No.: PCT/FR2015/053691
§ 371 (c)(1),
(2) Date: Jun. 27, 2017

(87) PCT Pub. No.: WO2016/108008
PCT Pub. Date: Jul. 7, 2016

(65) Prior Publication Data
US 2017/0368572 A1    Dec. 28, 2017

(30) Foreign Application Priority Data

Dec. 30, 2014  (FR) ..................... 14 63442

(51) Int. Cl.
| | | |
|---|---|---|
| *B05D 5/06* | (2006.01) | |
| *B05D 3/04* | (2006.01) | |
| *B05D 3/12* | (2006.01) | |
| *B05D 5/08* | (2006.01) | |
| *A47J 36/02* | (2006.01) | |
| *B05D 3/02* | (2006.01) | |

(52) U.S. Cl.
CPC ............ *B05D 5/061* (2013.01); *A47J 36/025* (2013.01); *B05D 3/0272* (2013.01); *B05D 3/042* (2013.01); *B05D 3/12* (2013.01); *B05D 5/083* (2013.01)

(58) Field of Classification Search
CPC .......... B05D 5/06; B05D 5/061; A47J 36/025
USPC ........ 427/261–263, 267–268, 270, 274, 348, 427/355, 368, 369
See application file for complete search history.

(56) References Cited

U.S. PATENT DOCUMENTS

| | | | | |
|---|---|---|---|---|
| 779,655 | A * | 1/1905 | Kenkel | B05D 5/06 427/262 |
| 4,044,177 | A * | 8/1977 | Paulus | B05D 5/06 427/264 |
| 4,054,704 | A * | 10/1977 | Vassiliou | B05D 5/06 427/145 |
| 4,180,609 | A * | 12/1979 | Vassiliou | A47J 36/02 427/375 |

(Continued)

FOREIGN PATENT DOCUMENTS

| | | |
|---|---|---|
| DE | 102010052057 A1 | 5/2012 |
| EP | 1710214 A1 | 10/2006 |

(Continued)

*Primary Examiner* — Cachet I Sellman
(74) *Attorney, Agent, or Firm* — The Webb Law Firm

(57) ABSTRACT

Provided is a method for decorating a kitchen item by means of mechanical treatment in order to produce a decoration. The mechanical treatment involves removing and/or displacing part of a thermostable decorative composition by means of pressure and moving a tool or a compressed air jet over the surface of the decorative layer.

12 Claims, 5 Drawing Sheets

(56) References Cited

U.S. PATENT DOCUMENTS

| | | | | |
|---|---|---|---|---|
| 4,259,375 A * | 3/1981 | Vassiliou | ................ | B05D 5/06 118/301 |
| 4,376,812 A * | 3/1983 | West | ................ | B32B 38/06 428/165 |
| 4,388,350 A * | 6/1983 | Ayers | ................ | A44C 27/00 427/262 |
| 4,508,763 A * | 4/1985 | Shemenski | ................ | B05D 1/28 427/262 |
| 4,677,000 A * | 6/1987 | Gardaz | ................ | B05D 5/06 427/261 |
| 5,667,891 A * | 9/1997 | Batzar | ................ | A47J 36/02 427/203 |
| 5,686,160 A * | 11/1997 | Yamada | ................ | B44C 1/26 220/912 |
| 5,711,995 A * | 1/1998 | Batzar | ................ | B05D 5/061 427/258 |
| 5,718,963 A * | 2/1998 | Batzar | ................ | B05D 5/068 428/141 |
| 5,728,455 A * | 3/1998 | Batzar | ................ | B05D 5/061 428/201 |
| 8,227,072 B2 | 7/2012 | Le Bris et al. | | |
| 2007/0115337 A1 * | 5/2007 | Raksha | ................ | B05D 3/207 347/105 |
| 2007/0178243 A1 | 8/2007 | Houck et al. | | |
| 2011/0192850 A1 * | 8/2011 | Le Bris | ................ | A47J 36/02 220/573.2 |
| 2011/0287251 A1 * | 11/2011 | Leech | ................ | C09D 127/18 428/327 |
| 2013/0040116 A1 * | 2/2013 | Henze | ................ | C03C 1/008 428/201 |
| 2015/0104576 A1 * | 4/2015 | Kim | ................ | C09D 5/002 427/267 |

FOREIGN PATENT DOCUMENTS

| | | |
|---|---|---|
| EP | 2412846 A1 | 2/2012 |
| EP | 2578323 B1 | 10/2013 |
| FR | 2808732 A1 | 11/2001 |

\* cited by examiner

METHOD FOR DECORATING A KITCHEN ITEM BY MECHANICAL TREATMENT

CROSS REFERENCE TO RELATED APPLICATIONS

This application is the United States national phase of International Application No. PCT/FR2015/053691 filed Dec. 21, 2015, and claims priority to French Patent Application No. 1463442 filed Dec. 30, 2014, the disclosures of which are hereby incorporated in their entirety by reference.

FIELD OF THE INVENTION

This invention generally relates to a method for decorating a kitchen item by means of mechanical treatment in order to produce a decoration.

DESCRIPTION OF RELATED ART

Of course, kitchen items must meet performance criteria with regard to their non-stick properties and their scratch resistance, and more generally to the various kinds of wear and tear to which they are subjected while in use.

However, today's consumers are looking for items that are increasingly aesthetically pleasing. While aesthetic quality may be achieved by a particular form, these consumers also have rising expectations regarding the color or multiple colors, "material" effects, a textured feel and the richness of the decoration. It is thus necessary to develop methods of obtaining these effects. This pertains to fluorocarbon resin-based or enamel coatings, but this demand also applies to the ceramic coatings that have appeared in recent years. The novelty of their chemistry and a broadened color palette initially sufficed to draw the interest of consumers, but it now appears that, in order to continue to win them over, new effects must be used, as well as methods for creating them.

In an effort to meet this demand, the Applicant has developed methods that are particularly suitable to this type of coating for obtaining such effects.

Generally, these effects can be divided into two categories, based on whether they are realistic decorations or "material" effects.

Realistic decorations are obtained by transferring a decoration pre-existing on a film onto the coating. The transfer can be done by contact in an aqueous substrate, by sublimation, tampography, serigraphy or ink jet.

"Material" effects are achieved by a mechanical treatment of one of the coating layers, which allows different layers to be visible, potentially at the same time.

The present invention pertains, more specifically, to obtaining decorations by means of a mechanical treatment of the coating of the item, consisting, for example, of obtaining a negative imprint by removing or engraving an upper layer of the coating, or by moving material of the upper layer of the coating, in order to create a textured feel on the surface of the item and/or cause the underlying color (of the substrate or of an intermediate layer between the substrate and the upper layer) to appear.

Treat a coating for the purpose of modifying its appearance to obtain an effect is already known to those skilled in the art.

Thus, for example, U.S. Pat. No. 779,655 describes the application of a powerful current of air to the wet upper layer of an enamel coating to modify its appearance, thereby obtaining a coating with a speckled, wavy or variegated appearance. This document describes a method comprising the application of a first enamel layer, the baking of this first enamel layer, the application of a second enamel layer, the creation of relief on the surface of this second wet enamel layer, and then the baking of the second enamel layer.

French patent FR 2808732 describes a cooking utensil consisting of a base metal material, which is coated with a hard chromium layer, on its interior surface or its exterior surface. According to a first embodiment variation, marking is done on the hard chromium layer by means of a local electrochemical stripping step or by sandblasting.

In light of the prior art, the Applicant has developed methods that can be used to obtain, under acceptable energy conditions, decorated exterior coatings for kitchen items possessing good mechanical resistance, stain resistance and adhesion properties.

SUMMARY OF THE INVENTION

More specifically, the object of the present invention is a method of decorating a kitchen item comprising a substrate, said method comprising the following steps:

Supply of a substrate with two opposite surfaces;

Application of at least one heat-stable base composition over an area of one of the surfaces of the substrate, to form at least one base layer, the heat-stable base composition being a sol-gel composition, or an aqueous slurry of enamel frit, or an aqueous composition comprising a fluorocarbon resin dispersion;

Application of at least one heat-stable decorative composition on the base layer, to form at least one decorative layer, the decorative composition being a sol-gel composition, or an aqueous slurry of enamel frit, or an aqueous composition comprising a fluorocarbon resin dispersion;

Mechanical treatment of the surface of the decorative layer, in order to make a decoration, the mechanical treatment comprising a removal and/or movement of a portion of the decorative composition by means of pressure, and the movement of a tool or of a compressed air jet over the surface of the decorative layer;

Drying of the mechanically treated decorative layer when the decorative composition is an aqueous slurry of enamel frit or an aqueous composition comprising a fluorocarbon resin dispersion, and potentially when the decorative composition is a sol-gel composition (the drying of the decorative layer being optional in the case of a decorative layer obtained through a sol-gel composition); and Thermal densification treatment of the coated substrate, no thermal densification treatment of the coated substrate being done between the base composition application step and the decorative composition application step.

For the purposes of this invention, the term "heat-stable composition" refers to a composition making it possible to obtain a coating that, after thermal densification treatment, does not experience any deterioration when subjected to normal cooking temperatures, which is to say, temperatures that can range up to 280° C.

For the purposes of this invention, the term "surface of a layer" refers to the surface of said layer that is opposite the substrate.

For the purposes of this invention, the term "drying of a layer" refers to a step of the method that makes it possible to eliminate most of the solvents (including water) from said layer, and thereby obtain said layer in the form of a film that is solid enough to be dry to the touch, but that is not completely densified, this step being performed at a temperature of less than or equal to 120° C. when said layer is obtained from a sol-gel composition or an aqueous composition comprising a fluorocarbon resin dispersion, and less than or equal to 300° C. when said layer is obtained from an aqueous slurry of enamel frit.

For the purposes of this invention, the term "thermal densification treatment of the coated substrate" refers to a thermal treatment that makes it possible to densify the layers applied to the substrate, this thermal densification treatment being performed at a temperature of greater than 150° C. when said layers are obtained from sol-gel compositions and/or aqueous compositions comprising a fluorocarbon resin dispersion, and greater than 300° C. when said layers are obtained from aqueous slurries of enamel frit.

The method according to the invention disclaims any thermal densification treatment of the coated substrate between the base composition application step and the decorative composition application step. Thus, all of the coating applied to said area of the substrate is densified in a single thermal densification treatment, making it possible to obtain a kitchen item decorated under acceptable energy conditions.

Advantageously, the base composition may be of the same kind as the decorative composition.

In other words, if the decorative layer is a layer of sol-gel material, it could be the same for the base layer. Likewise, if the decorative layer is a fluorocarbon resin-based layer, it could be the same for the base layer. Finally, if the decorative layer is made of enamel, it could be the same for the base layer.

Advantageously, the surface of this base layer may be subjected to a mechanical treatment to make a decoration. This mechanical treatment is as described below in reference to the decorative layer.

Advantageously, the method according to the invention may also comprise, in the area of the substrate where the base and decorative layers are formed, the application of at least one additional layer, as a primary adhesion layer, if the base layer is fluorocarbon resin-based.

The method according to the invention may also comprise a step of drying said base layer, which may be eventually mechanically treated so as to make a decoration, when the base composition is a sol-gel composition or an aqueous composition comprising a fluorocarbon resin dispersion. If performed, this drying step must be done prior to the decorative composition application step.

Advantageously, the drying of the base layer prior to the application of the decorative composition makes it possible to limit interactions between the base layer and the decorative layer, such as distemper, for example, which could locally weaken the final coating.

In the method according to the invention, after the decorative composition application step, and, as applicable, prior to the decorative layer drying step, a mechanical treatment is performed on the surface of the decorative layer in order to make a decoration, the mechanical treatment comprising a removal and/or movement of a portion of the decorative composition by means of pressure and the movement of a tool or a compressed air jet on the surface of the decorative layer.

According to a first embodiment of the mechanical treatment, the removal and/or movement of a portion of the decorative composition may be done by means of the translational movement and pressure from a tool or a compressed air jet on the surface of the decorative layer, while the substrate is held still.

According to a second embodiment of the mechanical treatment, the removal and/or movement of a portion of the decorative composition may be done by means of pressure from a tool or a compressed air jet on the surface of the decorative layer, while the substrate is moved in translation.

According to a third embodiment of the mechanical treatment, the removal and/or movement of a portion of the decorative composition may be done by means of pressure from a tool or a compressed air jet on the surface of the decorative layer while the tool or compressed air jet spins around the substrate.

According to a fourth preferred embodiment of the mechanical treatment, the removal and/or movement of a portion of the decorative composition may be done by means of pressure from a tool or a compressed air jet on the surface of the decorative layer, while the substrate is spinning.

In all of these embodiment variations, if the removal and/or movement are done by means of pressure from a tool, the tool may advantageously be a paintbrush, brush, comb, sponge or abrasive pad.

In all of these embodiment variations, if the removal and/or movement are done by means of pressure of an air jet, compressed air jets sprayed by one or more nozzles are advantageously used.

Advantageously, the mechanical treatment according to the present invention may be done so as to cause the underlying base layer to appear, at least partially. However, the mechanical treatment of the method according to the invention may also be done in such a way as not to cause the underlying base layer to appear, even partially.

If the base layer is subjected to a mechanical treatment so as to make a decoration, this mechanical treatment may also be done according to any of the characteristics described above pertaining to the mechanical treatment of the decorative layer.

Advantageously, according to one embodiment of the method according to the invention, at least two heat-stable decorative compositions are applied to an area of one of the surfaces of the substrate, to form at least two decorative layers, the mechanical treatment thus comprising a removal and/or movement of a portion of the decorative compositions. In other words, if the method comprises the application of several decorative layers, they are all mechanically treated at the same time, and then, if necessary, also dried at the same time.

All of the characteristics described above with reference to the method comprising the application of a decorative composition apply in a similar way to the method comprising the application of multiple decorative compositions.

As for the visual rendering of the decoration, two alternatives may be considered.

For the purposes of the invention, the term "visual rendering" refers to the user's perception of the appearance of the decoration in terms of colored effect, due, as applicable, to the presence of pigments and/or glitter, and also in terms of transparency or opacity.

For the purposes of this invention, the term "transparent or colorless composition or layer" refers to a layer or composition that allows the full spectrum of visible light to pass through and does not comprise any pigments or glitter.

For the purposes of this invention, the term "opaque layer or composition" refers to a layer or composition that does not allow any light in the visible spectrum to pass through. The opacity can come, for example, from the presence of pigments and/or glitter in the layer or composition.

For the purposes of this invention, the term "translucent layer or composition" refers to a layer or composition that partially allows light in the visible spectrum to pass through, for example, due to the presence of pigments and/or glitter in the layer or composition.

For the purposes of this invention, the term "colored layer or composition" refers to a layer or composition that has a visual rendering with a colored effect, in which the colored effect may be produced by pigments and/or glitter.

According to a first alternative, the decorative composition, the base composition and the substrate have the same visual rendering. In this case, the decoration is only an effect that creates a textured feel to the touch.

According to one variation of this first alternative, the decorative composition may comprise at least one pigment and/or glitter, and the base composition may comprise at least one pigment and/or glitter that is identical to those in the decorative composition.

According to a second alternative, the decorative composition and/or the base composition and/or the substrate do not have the same visual rendering.

According to a first variation of this second alternative, the base layer may be transparent, while the decorative layer may comprise at least one pigment and/or glitter giving it a different visual rendering from that of the substrate.

Advantageously, in this first variation, the mechanical treatment is done in order to cause the base layer to appear. Thus, the decoration obtained has a "material" effect, through the difference in visual rendering between the decorative layer and the substrate visible through the transparent base layer, as well as a textured feel to the touch.

For the purposes of this invention, the term "material effect" refers to a visual rendering of the decoration that imitates, for example, wood (wood effect), marble (marble effect), brushed metal (brushed metal effect), and so on.

According to a second variation of this second alternative, the decorative composition may comprise at least one pigment and/or glitter, and the base composition may be opaque and comprise at least one pigment and/or comprise glitter that are different from those in the decorative composition.

Advantageously, in this second variation, the mechanical treatment is performed in order to cause the base layer to appear. Thus, the decoration obtained has a "material" effect, through the difference in visual rendering between the decorative layer and the base layer, as well as a textured feel to the touch.

Advantageously, regardless of the alternative considered (same or different visual rendering), the decorative composition and/or the base composition may comprise at least one pigment and/or glitter.

Pigments that may be used in this invention (for the base layer and/or the decorative layer in particular), include organic or inorganic heat-stable pigments.

Preferably, the pigments of the base and decorative compositions may be independently chosen from among titanium dioxide, spinels, iron oxides, perylene red, dioxazine purple, cobalt-aluminum mixed oxides, chromium oxides and copper oxides.

The glitter that may be used in this invention (for the base layer and/or the decorative layer in particular) may be independently chosen from among coated aluminum glitters and mica glitters, and in particular mica glitters treated to produce a particular color effect.

For the implementation of the method according to the invention, aqueous compositions comprising heat-stable fluorocarbon resin dispersions as the heat-stable decorative composition and/or the heat-stable base composition, may advantageously be used.

In these dispersions, the fluorocarbon resin may be used alone or in a mixture with at least one other heat-stable resin that is resistant to at least 200° C., and particularly an adhesive resin.

The fluorocarbon resins of the base and decorative compositions may be independently chosen from among polytetrafluoroethylene (PTFE), tetrafluoroethylene-perfluoro (propyl vinyl ether) copolymer (PFA), tetrafluoroethylene-hexafluoropropylene copolymer (FEP) or a mixture of these fluorocarbon resins.

If used, the heat-stable resins resistant to at least 200° C. may be independently chosen from among polyetherketones (PEK), polyetheretherketones (PEEK), and the following adhesive resins: polyamides imides (PAI), polyether imides (PEI), polyimides (PI), polyethersulfones (PES) and polyphenylene sulfides (PPS).

When the base composition is an aqueous composition comprising a fluorocarbon resin dispersion, the base composition may advantageously further comprise at least one cohesion-promoting material, said material that makes it possible to reinforce the mechanical resistance of a film not yet thermally densified.

According to a first variation, the cohesion-promoting material of the base layer may be advantageously chosen from among silicas in colloidal form or micrometric or nanometric powder form, aluminas in colloidal form or micrometric or nanometric powder form, carbonates in colloidal form or micrometric or nanometric powder form, laponite in colloidal form or micrometric or nanometric powder form, and thickening agents of the inorganic type (such as zeolites).

According to a second variation, the cohesion-promoting material of the base layer may advantageously be chosen from among cellulose derivatives having minimum film formation temperatures of less than 200° C., and preferably less than 80° C. and thermoplastic (meth)acrylic (co)polymers having minimum film formation temperatures of less than 200° C., and preferably less than 80° C.

Advantageously, the cohesion-promoting material of the base layer may be present in the base composition in the amount of 1 to 25% by weight, and preferably between 2 and 15% by weight, with respect to the total weight of the base composition.

When the base composition is an aqueous composition comprising a fluorocarbon resin dispersion, the base layer may advantageously have, prior to any potential mechanical treatment step, a wet thickness between 10 and 50 µm, and preferably between 15 and 30 µm.

If the base composition is an aqueous composition comprising a fluorocarbon resin dispersion, the method according to the invention may advantageously comprise, between the application of the base composition (or any mechanical treatment of the base layer surface) and the application of the decorative composition, a base layer drying step, which may be done at a temperature between 25 and 100° C., and preferably between 40 and 80° C.

When the decorative composition is an aqueous composition comprising a fluorocarbon resin dispersion, the decorative layer may advantageously have, prior to the mechanical treatment step, a wet thickness between 5 and 100 µm, and preferably between 8 and 40 µm.

If the decorative composition is an aqueous composition comprising a fluorocarbon resin dispersion, the method according to the invention comprises, between the mechanical treatment step of the decorative layer surface and the thermal densification treatment, a decorative layer drying step, which may be done at a temperature between 20 and 100° C., and preferably between 40 and 80° C.

After drying the decorative layer, following the method according to the invention, a thermal densification treatment is performed. When the decorative composition and/or the base composition are aqueous compositions comprising fluorocarbon resin dispersions, the thermal densification treatment may advantageously consist of baking at a temperature between 350 and 450° C., and preferably between 380 and 430° C.

For implementing the method according to the invention, sol-gel compositions may advantageously be used as the heat-stable decorative composition and/or the heat-stable base composition.

Advantageously, these sol-gel compositions may be obtained by hydrolysis of a sol-gel precursor of the metal alkoxide type, by adding water and an acidic or basic catalyst, and then by condensation.

As a precursor, a metal alkoxide is preferably used, chosen from among the group consisting of:
Precursors corresponding to the general formula $M_1(OR_1)_n$, 
Precursors corresponding to the general formula $M_2(OR_2)_{(n-1)}R_2'$, and
Precursors corresponding to the general formula $M_3(OR_3)_{(n-2)}R_3'$, with:
$R_1$, $R_2$, $R_3$ or $R_3'$ designating an alkyl group,
$R_2'$ designating an alkyl group that may be functionalized or a phenyl group that may be functionalized,
n being an integer corresponding to the maximum valence of $M_1$, $M_2$ or $M_3$,
$M_1$, $M_2$ or $M_3$ designating an element chosen from among Si, Zr, Ti, Sn, Al, Ce, V, Nb, Hf, Mg or lanthanides (Ln).

Advantageously, the metal alkoxide is an alkoxysilane.

The alkoxysilanes that may be used in the sol-gel compositions of the method in the invention include methyltrimethoxysilane (MTMS), methyltriethoxysilane (MTES), tetraethoxysilane (TEOS), tetramethoxysilane (TMOS), and 3-glycidoxypropyltrimethoxysilane (GLYMO), aminopropyl-triethoxysilane (APTES) and their mixtures.

Preferably, the alkoxysilanes MTES and TEOS are used, as they offer the advantage of not containing methoxy groups. Indeed, hydrolysis of methoxy groups leads to the formation of methanol in the sol-gel formulation, which, given its classification as toxic, requires additional precautions during application. By contrast, hydrolysis of ethoxy groups produces only ethanol, which has a more favorable classification, and therefore less restrictive usage requirements for the sol-gel coating.

When the base composition is a sol-gel composition, the base layer may advantageously have, prior to any mechanical treatment step, a wet thickness between 10 and 100 μm, and preferably between 30 and 70 μm.

If the base composition is a sol-gel composition, the method according to the invention may advantageously comprise, between the application of the base composition (or any potential mechanical treatment of the base layer surface) and the application of the decorative composition, a base layer drying step, which may be done at a temperature between 20 and 100° C., and preferably between 40 and 80° C.

When the decorative composition is a sol-gel composition, the decorative layer may advantageously have, prior to the mechanical treatment step, a wet thickness comprised between 5 and 70 μm, and preferably between 10 and 30 μm.

If the decorative composition is a sol-gel composition, the method according to the invention may advantageously comprise, between the mechanical treatment step of the decorative layer surface and the thermal densification treatment step, a decorative layer drying step, which may be done at a temperature comprised between 20 and 120° C., and preferably between 40 and 100° C. If the decorative composition is a sol-gel composition, the drying step of the decorative layer is optional.

After any optional drying of the decorative layer, following the method according to the invention, a thermal densification treatment is performed on the coated substrate. When the decorative composition and the base composition are sol-gel compositions, the thermal densification treatment may advantageously consist of baking at a temperature of greater than 150° C. and less than or equal to 350° C., and preferably comprised between 200 and 300° C.

For implementing the method according to the invention, aqueous slurries of enamel frit may also advantageously be used as heat-stable decorative and base compositions.

Advantageously, aqueous slurries of enamel frit may contain a frit consisting mostly of silicon oxide, mixed with fluxing agents of the iron oxide, vanadium oxide, boron oxide, sodium oxide or potassium oxide type.

When the base composition is an aqueous slurry of enamel frit, the base layer may advantageously have, prior to any mechanical treatment step, a wet thickness comprised between 30 and 120 μm, and preferably between 40 and 90 μm.

When the base composition is an aqueous slurry of enamel frit, the drying of the base layer prior to the application of the decorative composition is excluded. Indeed, if the enamel-based base layer had to be dried, shrinkage and holes in this layer would appear during the thermal densification treatment of the coated substrate, which would create a non-compliant coating.

When the decorative composition is an aqueous slurry of enamel frit, the decorative layer may advantageously present, prior to the mechanical treatment step, a wet thickness comprised between 10 and 80 μm, and preferably between 15 and 60 μm.

If the decorative and base compositions are aqueous slurries of enamel frit, the method according to the invention comprises, between the mechanical treatment step on the surface of the decorative layer and the thermal densification treatment step, a decorative layer drying step, which may be done at a temperature comprised between 40 and 300° C., and preferably between 80 and 200° C.

After the drying of the decorative layer, following the method according to the invention, a thermal densification treatment is performed on the coated substrate. When the decorative and base compositions are aqueous slurries of enamel frit, the thermal densification treatment may advantageously consist of baking at a temperature comprised between 550 and 1000° C.

Advantageously, the method according to the invention may also comprise, prior to the thermal densification treatment of the coated substrate, a step to apply at least one heat-stable, translucent finishing composition to the decorative layer, which may have been dried, to form a finishing layer, and a finishing layer drying step, when the finishing composition is an aqueous slurry of enamel frit or an aqueous composition comprising a fluorocarbon resin dispersion, and as applicable, when the finishing composition is a sol-gel composition.

Advantageously, the finishing composition is of the same kind as the decorative composition.

Advantageously, the finishing composition may comprise at least one pigment and/or comprise glitter, the pigments and glitters being defined as they were defined above in reference to the decorative and base compositions.

If the finishing composition is an aqueous composition comprising a fluorocarbon resin dispersion, the finishing layer may advantageously have a wet thickness between 5 and 80 µm, and preferably between 10 and 40 µm.

If the finishing composition is a sol-gel composition, the finishing layer may advantageously have a wet thickness comprised between 2 and 20 µm, and preferably between 5 and 15 µm.

If the finishing composition is an aqueous slurry of enamel frit, the finishing layer may advantageously have a wet thickness between 10 and 80 µm, and preferably between 15 and 60 µm.

The method according to the invention may advantageously comprise a drying step of the finishing layer, which may be done at a temperature comprised between 25 and 100° C., and preferably between 40 and 80° C.

The base, decorative and finishing layers may, according to the method of this invention, be dried. The drying of each of these layers may advantageously consist of open air drying, drying under short-wave infrared radiation, drying under medium-wave infrared radiation, forced air drying or baking.

Advantageously, the substrate of the kitchen item used in the method according to the invention was shaped prior to the substrate supply step. Preferably, it is in the shape of a cap, the base and decorative layers being applied to the exterior of the cap. In addition, advantageously, the area of the substrate to which the base and decorative layers are applied is the skirt of the cap.

Different kinds of items meeting the specifications of the invention can be considered, in different shapes and made of different materials.

Thus, the substrate may be a metal, glass, ceramic or baked clay material.

The metal substrates that may be used in the method according to the invention may advantageously include substrates made of anodized or non-anodized aluminum, which may be polished, brushed, sandblasted or microbead-blasted, or made of anodized or non-anodized aluminum alloys, which may be polished, brushed, sandblasted or microbead-blasted, or made of steel, which may be polished, brushed, sandblasted or microbead-blasted, or made of stainless steel, which may be polished, brushed, sandblasted or microbead-blasted, or made of steel, aluminum or iron casting, or made of copper, which may be hammered or polished.

The metal substrates that may be used in the method according to the invention may also include metal substrates comprising the following ferritic stainless steel/aluminum/austenitic stainless steel layers, or stainless steel/aluminum/copper/aluminum/austenitic stainless steel, or even a cap made of cast aluminum, aluminum or aluminum alloys reinforced with a stainless steel exterior bottom.

The kitchen item that is decorated according to the method of the invention may be an item, for example, of which the surface not coated at least by the decorative layer is a concave interior surface designed to be positioned on the side where food may be placed into said item, and an opposite second of said surfaces is a convex exterior surface designed to be positioned toward a heat source.

Non-limiting examples of kitchen items that meet the specifications of the present invention include kitchen items such as saucepans and frying pans, woks and sauté pans, stockpots and soup pots, crepe pans, grills, pastry molds and trays, barbecue plates and grills and food preparation bowls.

Finally, the method according to the invention may also further comprise a step to apply, to the surface of the substrate opposite the one provided with base and decorative layers, at least one aqueous fluorocarbon resin dispersion and/or at least one sol-gel composition to form a non-stick coating, and potentially a drying step for the non-stick coating, such steps being performed:
- prior to any potential step to apply the base composition, or
- between the drying step of the mechanically-treated decorative layer and the thermal densification treatment step performed on the coated substrate, or
- at the same time as the steps to apply (and, as applicable, mechanically treat and dry) the base layer and the steps to apply and mechanically treat (and, as applicable, dry) the decorative layer, when
  - the decorative layer is obtained from a sol-gel composition and the non-stick coating comprises a fluorocarbon resin dispersion, or
  - the decorative layer is obtained from a sol-gel composition and the non-stick coating comprises a sol-gel composition, or
  - the decorative layer is obtained from an aqueous composition comprising a fluorocarbon resin dispersion, and the non-stick coating comprises a fluorocarbon resin dispersion, or
- after the thermal densification treatment of the coated substrate, when the decorative layer is obtained from an aqueous slurry of enamel frit, or
- after the thermal densification treatment of the coated substrate, when the decorative layer is obtained from an aqueous composition comprising a fluorocarbon resin dispersion and when the non-stick coating comprises a sol-gel composition.

BRIEF DESCRIPTION OF THE DRAWINGS

Other advantages and specific characteristics of the present invention will become apparent in the description below, which is provided as a non-limiting example, in reference to the examples and corresponding attached drawings.

The same components represented in FIGS. 1 and 2 are identified by the same reference numbers.

DETAILED DESCRIPTION OF THE INVENTION

Figure 1:
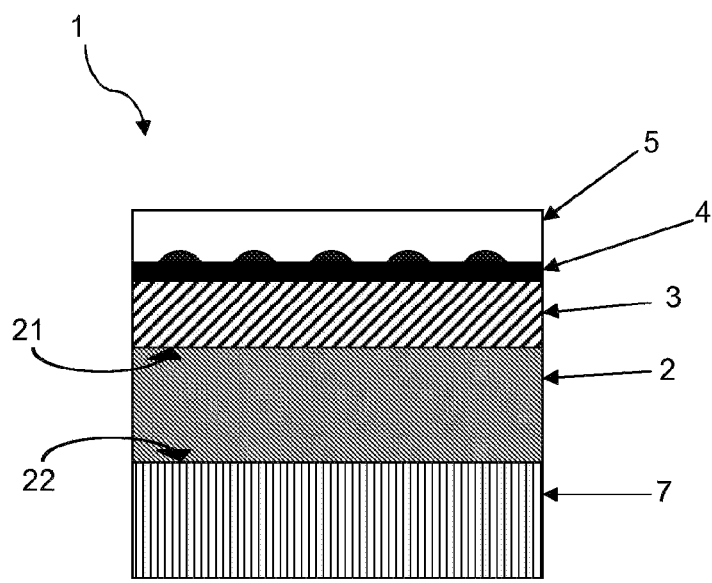
FIG. 1 represents a schematic cross-section view of a kitchen item obtained following the method according to the invention, according to a first embodiment variation.
Figure 2:
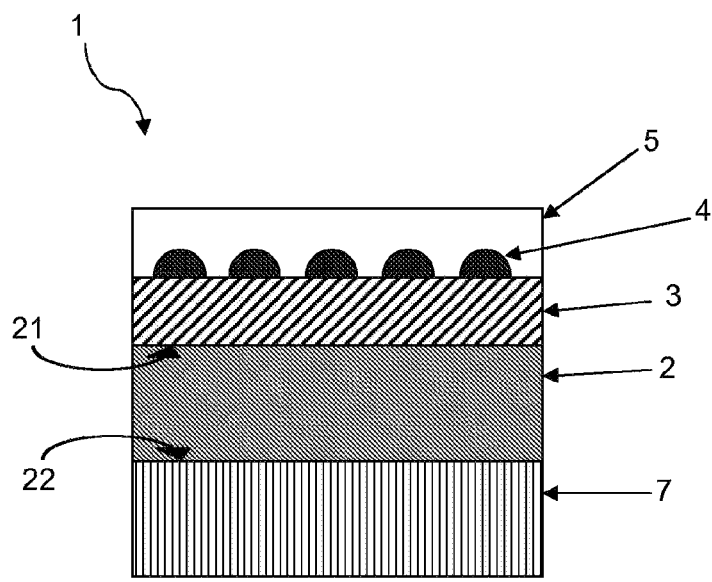
FIG. 2 represents a schematic cross-section view of a kitchen item obtained following the method according to the invention, according to a second embodiment variation.

In FIGS. 1 and 2, attached, portions of a kitchen item (1) are depicted, each of which comprises a substrate (2) made of aluminum (like in the examples described below), with two opposite surfaces (22, interior surface, and 21, exterior surface). The interior surface (22) is covered in a non-stick coating (7), while the exterior surface (21) is covered in a coating decorated as described in the method according to the invention.

In FIG. 1, the exterior surface (21) of the substrate (2) is provided with a base layer (3) and a decorative layer. The decorative layer (4) has been mechanically treated in order to create a decoration. However, the mechanical treatment did not cause the base layer (3) to appear. A translucent finishing layer (5) was deposited on the mechanically-treated decorative layer (4).

FIG. 2 differs from FIG. 1 in that the mechanical treatment of the decorative layer (4) was done in order to cause the base layer (3) to appear.

The invention is illustrated in greater detail in the following examples.

In these examples, unless otherwise indicated, all percentages and portions are expressed as percentages by mass.

EXAMPLES

Figure 3:
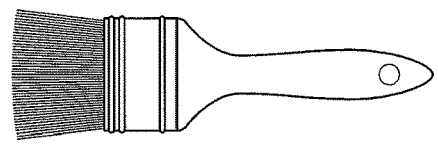
FIGS. 3 through 11 are described below in the descriptive part pertaining to the examples.
Figure 4:
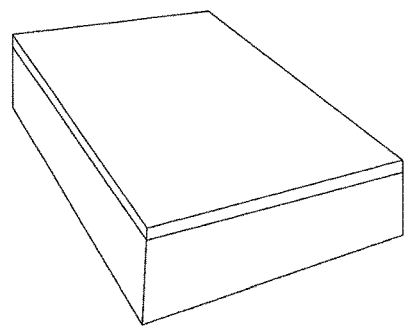
Figure 5:
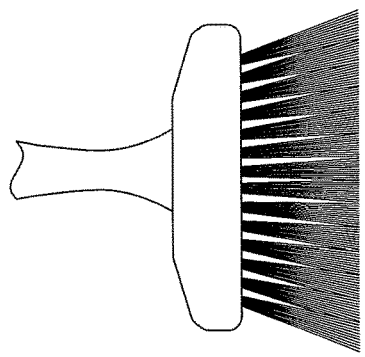
Figure 6:
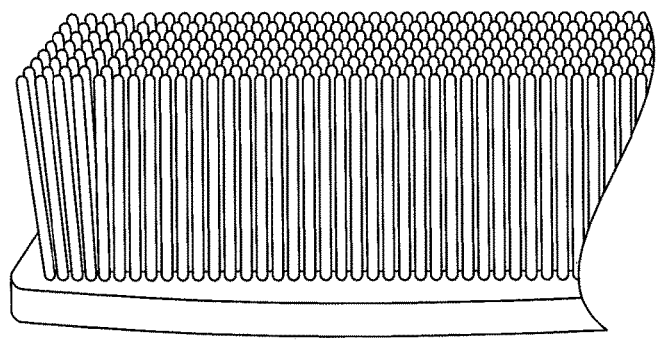
Figure 7:
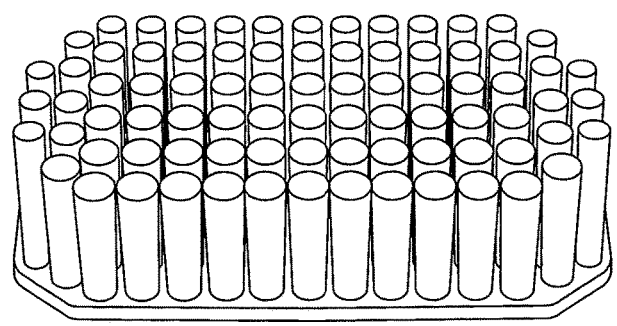

Products
Texturing Tools:
Paintbrush with flexible natural bristles depicted in FIG. 3
Green Scotch-Brite® pad depicted in FIG. 4
Paintbrush with hard polyethylene bristles depicted in FIG. 5
Brush with flexible silicone bristles depicted in FIG. 6
Brush with hard polyethylene bristles depicted in FIG. 7
Substrates:
Sandblasted, degreased aluminum caps
Smooth aluminum caps that have been chemically treated (degreasing, diluted soda, diluted nitric acid, rinsing)
Sol-gel Coating Formulations:
Colloidal silica in the form of an aqueous solution with 30% silica
Colloidal silica in the form of an aqueous solution with 40% silica
Isopropanol
Butyl glycol
Polydimethylsiloxane (PDMS)-based silicone oil
Load: alumina
Sol-gel precursor: Methyltriethoxysilane (MTES) corresponding to the formula $Si(OC_2H_5)_3CH_3$
Acids:
  Formic acid
  Acetic acid
Wetting agent
Pigments:
  Inorganic white pigment
  Inorganic black pigment
  Inorganic yellow pigment
Fluorocarbon Resin-based Coating Formulations:
Aqueous PTFE dispersion with 60% dry matter
Aqueous PFA dispersion with 50% dry matter
Colloidal silica with 30% dry matter
Water-soluble acrylic polymer
Non-charged surfactant of the alkylphenol ethoxylate type
Carbon black dispersion with 25% dry matter
PAI resin (with 10% dry matter) stabilized in water with co-solvents
Glitter:
  Mica glitter 1 treated to produce a blue color effect
  Mica glitter 2 treated to produce a red color effect Pigments:
Brown-colored pigment paste 1
White-colored pigment paste 2
Enamel Coating Formulations:
Enamel frit
Boric acid
KOH potash
Pigments:
  Inorganic white pigment
  Inorganic black pigment
  Inorganic yellow/green pigment

Example 1

Sol-gel Coating Decoration

A sol-gel base composition (SGF) that is opaque white in color was prepared, comprising the following compounds in the respective quantities indicated below:

| | |
|---|---|
| Colloidal silica (30% dry matter): | 25.0 g |
| Demineralized water: | 9.0 g |
| Isopropanol: | 4.0 g |
| Silicone oil: | 1.0 g |
| Inorganic white pigment: | 14.0 g |
| Alumina: | 11.0 g |
| MTES: | 35.5 g |
| Formic acid: | 0.5 g |
| TOTAL: | 100.0 g |

A first decorative sol-gel composition (SGD1) that is colored and translucent was prepared, comprising the following compounds in the respective quantities indicated below:

| | |
|---|---|
| Colloidal silica (40% dry matter): | 29.0 g |
| Demineralized water: | 9.0 g |
| Acetic acid: | 1.0 g |
| Isopropanol: | 5.0 g |
| Silicone oil: | 1.0 g |
| MTES: | 40.0 g |
| Butyl glycol: | 12.0 g |
| Wetting agent: | 1.0 g |
| Inorganic white pigment: | 1.0 g |
| Inorganic yellow pigment: | 0.7 g |
| Inorganic black pigment: | 0.3 g |
| TOTAL: | 100.0 g |

A second decorative sol-gel composition (SGD2) that is opaque and black in color, was prepared, comprising the following compounds in the respective quantities indicated below:

| | |
|---|---|
| Colloidal silica (40% dry matter): | 30.0 g |
| Demineralized water: | 10.0 g |
| Acetic acid: | 1.0 g |
| Isopropanol: | 5.0 g |
| Inorganic black pigment: | 2.0 g |
| Silicone oil: | 1.0 g |
| MTES: | 40.0 g |
| Butyl glycol: | 10.0 g |
| Wetting agent: | 1.0 g |
| TOTAL: | 100.0 g |

The sol-gel compositions described in detail above were prepared as follows:
The sol-gel precursor was mixed with the water, acids, solvents, pigments and colloidal silica in order to obtain the binder of each sol-gel composition; the reaction is rather quick (from a few minutes to one hour) depending on the quantity of composition being produced;

The different additives and surfactants are then added to the mixture.

The sol-gel compositions may be stored at room temperature, or under refrigeration in order to ensure maximum rheological stability of several days or even several weeks.

Wood Effect:

A base layer that is white in color, with a wet thickness of approximately 50 μm, was applied by spraying Composition SGF onto the exterior of the skirt of an aluminum cap, which was previously sandblasted and degreased.

A decorative layer that is brown in color, with a wet thickness of approximately 10 μm, was then applied by spraying Composition SGD1 onto the base layer.

This decorative layer was treated mechanically, immediately after application, using a paintbrush with hard polyethylene bristles (such as the one depicted, for example, in FIG. 5) at low pressure, in order to cause the underlying base layer to appear. The mechanical treatment was done on the cap while it was spinning.

The ensemble was then dried at 80° C. under infrared radiation, and then baked at 250° C. for 30 minutes.

Figure 8:
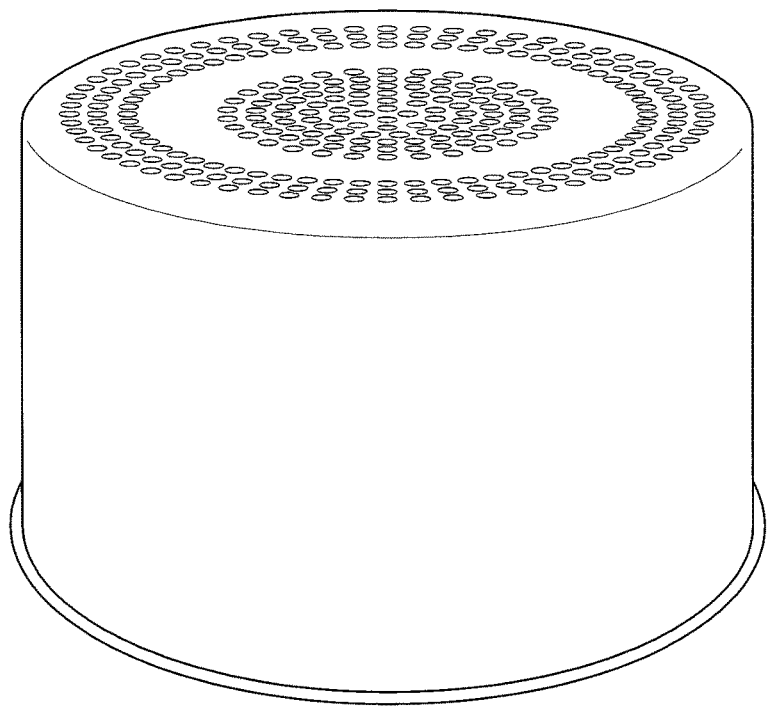

The cap thus coated and decorated is depicted in FIG. 8.

Black and White Effect:

A white-colored base layer with a wet thickness of approximately 40 μm, was applied by spraying Composition SGF onto the exterior of the skirt of an aluminum cap that was previously sandblasted and degreased.

The base layer was then dried at 70° C. for one minute under infrared radiation, and then cooled to room temperature.

A black-colored decorative layer with a wet thickness of approximately 15 μm, was then applied by spraying Composition SGD2 onto the base layer.

This decorative layer was mechanically treated, immediately after application, using a green Scotch-Brite® pad (such as the one depicted, for example, in FIG. 4) at low pressure, in order to cause the underlying base layer to appear. The mechanical treatment was done on the cap while it was spinning.

The ensemble was then dried at 100° C. under infrared radiation, and then baked at 250° C. for 30 minutes.

The cap thus coated and decorated is depicted in FIG. 8.

Example 2

Decoration of PTFE-based Coatings

A first opaque, black-colored base composition (CF1) was prepared, comprising the following compounds in the respective quantities indicated below:

| PTFE dispersion: | 35 g |
| PFA dispersion: | 5 g |
| Colloidal silica: | 10 g |
| Water-soluble acrylic polymer: | 5 g |
| Surfactant: | 1 g |
| Carbon black: | 4 g |
| PAI resin: | 30 g |
| Demineralized water: | 10 g |
| TOTAL: | 100 g |

A second opaque, brown-colored base composition (CF2) was prepared, comprising the following compounds in the respective quantities indicated below:

| PTFE dispersion: | 70 g |
| PFA dispersion: | 5 g |
| Colloidal silica: | 5 g |
| Water-soluble acrylic polymer: | 5 g |
| Surfactant: | 2 g |
| Pigment paste 1: | 5 g |
| Demineralized water: | 8 g |
| TOTAL: | 100 g |

A first opaque, red-colored, glittered decorative composition (CD1) was prepared, comprising the following compounds in the respective quantities indicated below:

| PTFE dispersion: | 80 g |
| PFA dispersion: | 5 g |
| Water-soluble acrylic polymer: | 1 g |
| Surfactant: | 2 g |
| Glitter 2: | 5 g |
| Demineralized water: | 7 g |
| TOTAL: | 100 g |

A second opaque, blue-colored, glittered decorative composition (CD2) was prepared, comprising the following compounds in the respective quantities indicated below:

| PTFE dispersion: | 80 g |
| PFA dispersion: | 5 g |
| Water-soluble acrylic polymer: | 1 g |
| Surfactant: | 2 g |
| Glitter 1: | 5 g |
| Demineralized water: | 7 g |
| TOTAL: | 100 g |

A third opaque, white-colored decorative composition (CD3) was prepared, comprising the following compounds in the respective quantities indicated below:

| PTFE dispersion: | 80 g |
| PFA dispersion: | 5 g |
| Water-soluble acrylic polymer: | 1 g |
| Surfactant: | 2 g |
| Pigment paste 2: | 5 g |
| Demineralized water: | 7 g |
| TOTAL: | 100 g |

A transparent, colorless finishing composition (CFin) was prepared, comprising the following compounds in the respective quantities indicated below:

| PTFE dispersion: | 80 g |
| PFA dispersion: | 5 g |
| Water-soluble acrylic polymer: | 5 g |
| Demineralized water: | 10 g |
| TOTAL: | 100 g |

Red Brushed Metal Effect:

A black-colored base layer with a wet thickness of approximately 20 μm, was applied by spraying Composition CF1 to the exterior of the skirt of an aluminum cap that was previously sandblasted and degreased.

The base layer was then dried at 80° C. under infrared radiation, and then cooled to room temperature.

A red-colored decorative layer with a wet thickness of approximately 20 µm, was then applied by spraying Composition CD1 onto the base layer.

This decorative layer was mechanically treated, immediately after application, using a dampened paintbrush with flexible natural bristles (as depicted, for example, in FIG. 3), at low pressure, in order to cause the underlying base layer to appear. The mechanical treatment was done on the cap while it was spinning.

The ensemble was then dried at 80° C. under infrared radiation, and then baked at 430° C. for 11 minutes.

Figure 9:
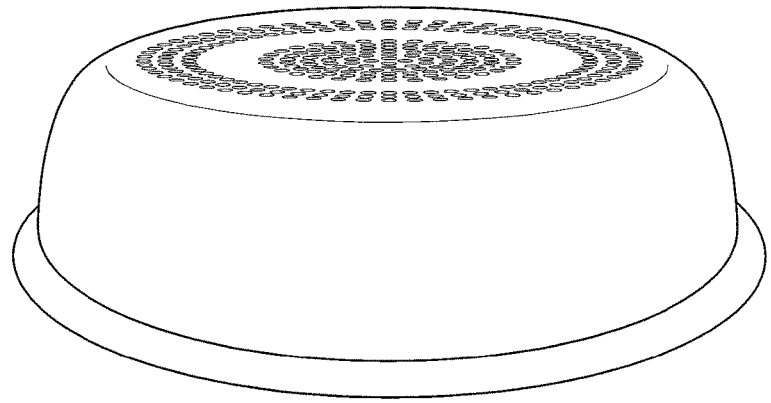

The cap thus coated and decorated is depicted in FIG. 9.

Blue Brushed Metal Effect with Finishing Layer:

A black-colored base layer with a wet thickness of approximately 20 µm, was applied by spraying Composition CF1 onto the exterior of the skirt of an aluminum cap that was previously sandblasted and degreased.

The base layer was then dried at 80° C. under infrared radiation, and then cooled to room temperature.

A blue-colored decorative layer with a wet thickness of approximately 20 µm, was then applied by spraying Composition CD2 onto the base layer.

This decorative layer was mechanically treated, immediately after application, using a brush with flexible silicone bristles (such as the one depicted, for example, in FIG. 6) at low pressure, in order to cause the underlying base layer to appear. The mechanical treatment was done while the cap was spinning.

The mechanically treated decorative layer was dried at 80° C. under infrared radiation, and then cooled to room temperature.

A finishing layer with a wet thickness of approximately 30 µm was then applied by spraying Composition CFin onto the decorative layer.

The ensemble was then dried at 80° C. under infrared radiation and then baked at 430° C. for 11 minutes.

Figure 10:
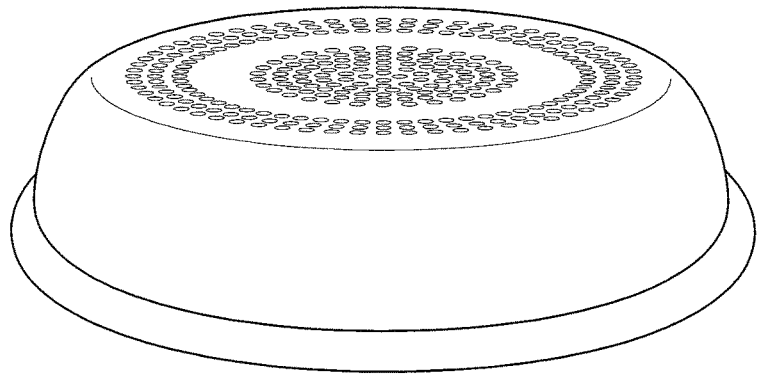

The cap thus coated and decorated is depicted in FIG. 10.

Wood Effect:

A first black-colored base layer with a wet thickness of approximately 15 µm, was applied by spraying Composition CF1 onto the exterior of the skirt of an aluminum cap that was previously sandblasted and degreased.

The first base layer was then dried at 80° C. under infrared radiation, and then cooled to room temperature.

A second brown-colored base layer with a wet thickness of approximately 15 µm, was applied by spraying Composition CF2 onto the first base layer and then dried at 80° C. under infrared radiation, and the cooled to room temperature.

A white-colored decorative layer with a wet thickness of approximately 15 µm, was then applied by spraying Composition CD3 onto the second base layer.

This decorative layer was mechanically treated, immediately after application, using a dampened paintbrush with flexible bristles (such as the one depicted, for example, in FIG. 3) at low pressure, in order to cause the underlying base layer to appear. The mechanical treatment was done on the cap while it was spinning.

The ensemble was then dried at 80° C. under infrared radiation and then baked at 430° C. for 11 minutes.

Figure 11:
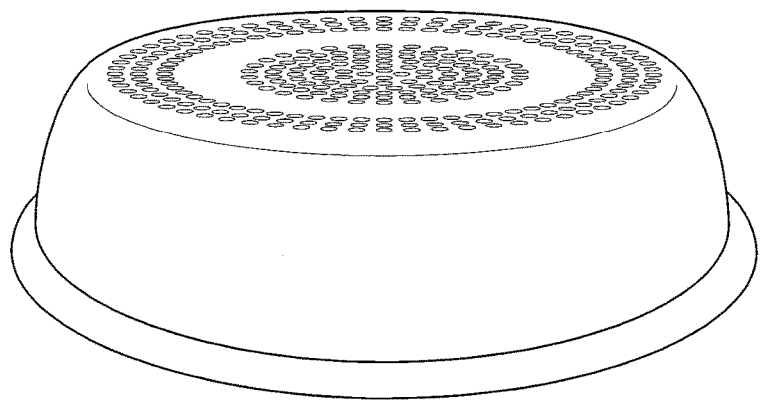

The cap thus coated and decorated is depicted in FIG. 11.

Example 3

Decoration of Enamel Coatings

A citronella-yellow-colored opaque base composition (EF) was prepared comprising the following compounds in the respective quantities indicated below:

| | |
|---|---|
| Enamel frit: | 57.0 g |
| Boric acid: | 2.0 g |
| KOH potash: | 0.5 g |
| Inorganic white pigment: | 1.5 g |
| Inorganic yellow/green pigment: | 7.0 g |
| Demineralized water: | 32.0 g |
| TOTAL: | 100.0 g |

A black-colored opaque decorative composition (ED) was prepared, comprising the following compounds in the respective quantities indicated below:

| | |
|---|---|
| Enamel frit: | 59.0 g |
| Boric acid: | 2.0 g |
| KOH potash: | 0.5 g |
| Inorganic black pigment: | 5.5 g |
| Demineralized water: | 33.0 g |
| TOTAL: | 100.0 g |

A citronella-yellow-colored base layer with a wet thickness of approximately 60 µm, was applied by spray from Composition EF onto the exterior of the skirt and the bottom of a smooth aluminum cap that was previously chemically treated.

A black-colored decorative layer with a wet thickness of approximately 40 µm, was then applied by spraying Composition ED onto the base layer.

This decorative layer was mechanically treated, immediately after application, using a brush with hard polyethylene bristles (such as the one depicted, for example, in FIG. 7) at low pressure, in order to cause the underlying base layer to appear. The mechanical treatment was done on the cap while it was spinning.

The ensemble was then dried at 120° C. under infrared radiation, and then baked at 560° C. for 15 minutes.

Tests

Exterior Stain Test

The caps obtained in the examples above were tested under real cooking conditions in order to evaluate any impact that the mechanical treatment might have on the stain resistance properties of the coating obtained. A series of three rounds of cooking was performed:

Potatoes

Ground beef

Beans

The stain resistance evaluation was performed visually by observing any stains, spattering or drips on the exterior skirt of each cap.

It was observed that the decoration of the exterior coating of the caps according to the examples above does not impact the stain resistance of said exterior coating during use in cooking.

Mechanical Resistance Test

The caps obtained in the examples above were tested through bead impact tests conducted with a gun to compare the mechanical resistance of the exterior coating of the caps obtained in the examples above to equivalent exterior coatings that did not undergo a mechanical decorative treatment.

Different forces were applied: 10 N, 20 N, 30 N, 40 N, 50 N, 60 N, 80 N and 90 N.

No difference in mechanical resistance was observed between the non-decorated coatings and the decorated coatings of the caps obtained in the examples above.

Resistance Test for Caps with a fluorocarbon resin-based exterior coating

The decorated caps obtained in the examples above and caps provided with equivalent exterior coatings that have not undergone decorative mechanical treatment were subjected to a crosscut test according to standards NF D 21-511 and NF T 30-068.

The skirts of the different caps were cut in order to obtain samples that were then submerged according to a series of three aging cycles, each comprising:

3 hours of submersion in a tank filled with 100° C. water, and 3 hours of submersion in a tank filled with 200° C. groundnut oil.

The adhesion to the metal of the exterior coatings of all the caps tested were deemed compliant.

Dishwasher Aging Test

The decorated caps obtained in the examples above and caps provided with equivalent exterior coatings that had not undergone any mechanical decorative treatment, were subjected to a series of 50 washing cycles in a dishwasher (SUN dishwasher detergent).

No deterioration was observed on any of the caps tested.

The invention claimed is:

1. A method of decorating a kitchen item comprising a substrate, said method comprising the following steps:
   supply of a substrate comprising two opposite surfaces;
   application of at least one heat-stable base composition over an area of one of the surfaces of the substrate to form at least on base layer, the heat-stable base composition being a sol-gel composition or an aqueous slurry of enamel frit or an aqueous composition comprising a fluorocarbon resin dispersion;
   application of at least one heat-stable decorative composition to the base layer to form at least one decorative layer, the heat-stable decorative layer being a sol-gel composition or an aqueous slurry of enamel frit or an aqueous composition comprising a fluorocarbon resin dispersion;
   mechanical treatment of the surface of the decorative layer in order to make a decoration, the mechanical treatment comprising a removal and/or movement of a portion of the heat-stable decorative composition by means of pressure and the movement of a tool or a compressed air jet on the surface of the decorative layer;
   drying of the mechanically-treated decorative layer when the heat-stable decorative composition is an aqueous slurry of enamel frit or an aqueous composition comprising a fluorocarbon resin dispersion, and, as applicable, when the heat-stable decorative composition is a sol-gel composition; and
   thermal densification treatment of the coated substrate, no thermal densification treatment of the coated substrate being done between the heat-stable base composition application step and the heat-stable decorative composition application step.

2. The method according to claim 1, in which the heat-stable decorative composition is of the same kind as the heat-stable base composition.

3. The method according to clam 1, also comprising, prior to the decorative composition application step, the following step:
   drying of said base layer, when the base composition is a sol-gel composition or an aqueous composition comprising a fluorocarbon resin dispersion.

4. The method according to claim 1, in which the removal and/or movement of a portion of the heat-stable decorative composition is done by means of pressure from a tool or of a compressed air jet on the surface of the decorative layer while the substrate is spinning.

5. The method according to claim 1, the tool being one of the following: a paintbrush, brush, comb, sponge or abrasive pad.

6. The method according to claim 1, in which the mechanical treatment is performed in such a way as to cause at least a portion of the underlying base layer to appear.

7. The method according to claim 1, in which the decorative composition and the base composition do not have the same visual rendering.

8. The method according to claim 1, in which the decorative composition and/or the base composition comprise at least one pigment and/or glitter.

9. The method according to claim 8, in which the pigments of the heat-stable base and decorative compositions are independently chosen from among organic or inorganic heat-stable pigments.

10. The method according to claim 8, in which the glitters of the heat-stable base and decorative compositions are independently chosen from among coated aluminum glitter and mica glitter.

11. The method according to claim 1, also comprising, prior to the thermal densification treatment step:
    a step to apply at least one translucent heat-stable finishing composition to said decorative layer, which may be dried, to form a finishing layer; and
    a step to dry the finishing layer when the heat-stable finishing composition is an aqueous slurry of enamel frit or an aqueous composition comprising a fluorocarbon resin dispersion, and, as applicable, when the heat-stable finishing composition is a sol-gel composition.

12. The method according to claim 11, in which the heat-stable finishing composition is of the same kind as the heat-stable decorative composition.

* * * * *

UNITED STATES PATENT AND TRADEMARK OFFICE
CERTIFICATE OF CORRECTION

PATENT NO. : 10,265,726 B2
APPLICATION NO. : 15/540157
DATED : April 23, 2019
INVENTOR(S) : Aurélien Dubanchet et al.

Page 1 of 1

It is certified that error appears in the above-identified patent and that said Letters Patent is hereby corrected as shown below:

In the Claims

Column 18, Line 12, Claim 3, delete "clam 1," and insert -- claim 1, --

Signed and Sealed this
Twenty-fifth Day of June, 2019

Andrei Iancu
*Director of the United States Patent and Trademark Office*